(12) United States Patent
Urso et al.

(10) Patent No.: US 6,751,327 B1
(45) Date of Patent: Jun. 15, 2004

(54) MINIATURE PLASTIC BATTERY ASSEMBLY FOR CANAL HEARING DEVICES

(75) Inventors: Richard C. Urso, Redwood City, CA (US); Loren L. Roy, San Jose, CA (US); Adnan Shennib, Fremont, CA (US); Patrick V. Williams, San Jose, CA (US); James P. Buckley, San Jose, CA (US)

(73) Assignee: Insonus Medical, Inc., Newark, CA (US)

( * ) Notice: Subject to any disclaimer, the term of this patent is extended or adjusted under 35 U.S.C. 154(b) by 699 days.

(21) Appl. No.: 09/613,205

(22) Filed: Jul. 11, 2000

(51) Int. Cl.[7] .............................................. H04R 25/00
(52) U.S. Cl. ....................... 381/323; 381/322; 381/324; 381/328; 181/130; 181/135
(58) Field of Search .................. 381/312, 322, 323, 324, 325, 328, 380; 429/27, 163, 164, 168; 181/135, 130; 600/25, 559; 607/55–57

(56) References Cited

U.S. PATENT DOCUMENTS

| | | | |
|---|---|---|---|
| 4,403,020 A | * | 9/1983 | Dampier |
| 5,724,431 A | * | 3/1998 | Reiter |
| 6,150,052 A | * | 11/2000 | Urry |
| 6,163,131 A | * | 12/2000 | Gartstein |
| 6,208,741 B1 | * | 3/2001 | Shennib |
| 6,567,527 B1 | * | 5/2003 | Baker |
| 6,627,349 B2 | * | 9/2003 | Urry |

* cited by examiner

*Primary Examiner*—Curtis Kuntz
*Assistant Examiner*—Dionne Harvey
(74) *Attorney, Agent, or Firm*—Townsend and Townsend and Crew, LLP

(57) ABSTRACT

A battery assembly is constructed of an elongated plastic shell irregularly shaped to fit optimally in anatomical cavities, particularly ear canals. The battery assembly relies structurally on a thin plastic shell which is designed to be inexpensively formed in a variety of complex shapes, thus offering superior volumetric utilization and energy capacity when compared with conventional metal button cell designs. In preferred embodiments, the shell is domed to distribute axial stresses so that it can be thin and still provide sufficient strength to avoid breakage in an extended wear environment despite its plastic composition. A preferred embodiment of a hearing device incorporating the battery assembly is disposable, to be discarded upon depletion of the electrical energy of the battery assembly.

62 Claims, 15 Drawing Sheets

Prior Art Battery Assembly

Prior Art Battery Assembly

MINIATURE PLASTIC BATTERY ASSEMBLY FOR CANAL HEARING DEVICES

CROSS-REFERENCE TO RELATED APPLICATIONS

This application is related to co-pending patent application Ser. No. 09/327,717, filed Jun. 8, 1999, titled "Extended Wear Canal Hearing Device," referred to herein as "the '717 application," assigned to the same assignee.

BACKGROUND OF THE INVENTION

1. Technical Field

The present invention relates generally to miniature batteries, and more particularly to miniature batteries that are asymmetrical to fit in irregularly shaped cavities such as ear canals for hearing aid applications.

2. Description of the Prior Art
(1) Conventional Hearing Aid Batteries

Hearing aids and other miniature devices primarily rely on button cells which are symmetrically round as shown in FIG. 1. The cell is generally constructed of anode and cathode cans, which provide structural support as well as electrical conductivity to the device connected thereto. The metal encapsulation also provides sealing for the active electrochemical material within. Metal cans employed in a typical button cell battery are generally formed from a steel strip having nickel coating or nickel-copper combination depending on the application. The can generally has a thickness range of from 0.1 to 0.2 mm. A button cell battery for hearing aid applications is highly symmetrical having a circular cross section with diameter (D) as shown in FIG. 2. Zinc air cells, which rely on air (oxygen) in the environment as a source for their internal electrochemical reaction, are widely used in hearing aid applications due to their exceptional volumetric energy efficiency.

(2) Brief Description of the Ear Canal and Canal Hearing Aids

The human external ear 10 is comprised of the pinna 12 and the ear canal 11, which is narrow and tortuously elongated as shown in FIG. 3. The ear canal 11 begins laterally with the canal aperture 13 and terminates medially with the eardrum 16. First and second bends, 14 and 15 respectively, are generally present and must be considered when designing a deeply inserted canal hearing device. The ear canal generally has an oval cross section (FIG. 4) with a long diameter ($CD_L$) and short diameter ($CD_S$).

Recent advances in miniaturization of electronics, transducers and batteries have led to the development of canal hearing aids which are partially or deeply inserted in the ear canal. Canal hearing devices are generally inconspicuous, thus very desirable for the hearing impaired who may be concerned with the social stigma and vanity associated with wearing a visible hearing aid. However, due to the complex shape of the ear canal, being elongated, contoured and oval at the cross section, the conventional cylindrical button cells used in standard canal hearing devices are inefficient in terms of volumetric utilization of the ear canal cavity. For this reason among others, hearing aids are notorious for requiring frequent battery replacement and being uncomfortable, particularly for small ear canals.

(3) Review of State-of-the-Art in Hearing Aid Related Battery Technology Cretzmeyer, et. al. (U.S. Pat. No. 4,189,526), Smilanich U.S. Pat. No. 4,404,266) and Oltman et al. U.S. Pat. No. 5,582,930) describe zinc-air button cell batteries with various improved features. These button cell batteries are made of a cathode (positive) metal can crimped over an anode (negative) metal can with a sealing element therebetween (i.e., 2 in FIG. 2 of the '930 patent). The two cans structurally support the battery assembly while providing electrical conductivity to a hearing device on the bottom and top as shown in FIG. 2. of the '930 patent. Although each metal can may be made relatively thin, in the range of 0.114 to 0.15 mm, the presence of two parallel walls on the circumference of the cell (2 and 3 in FIG. 1), in addition to a seal (7 in FIG. 1) therebetween, presents a triple-wall effect which adversely affects the volumetric efficiency (battery longevity/volume) for the battery assembly. This results in shorter battery life and frequent battery replacement. A battery compartment with electrical contacts also consumes space further reducing the volumetric efficiency of the hearing device. Another source of volumetric inefficiency in conventional hearing aids is the acrylic outer shell which represents a secondary enclosure with respect to the battery assembly within, thus reducing the volumetric efficiency of the canal hearing device.

Oltman et al., in U.S. Pat. No. 4,687,714 discloses a battery assembly including a plastic outer shell which is deformable to accommodate volumetric expansion of the anodic material during its oxidation. The cathode terminal is formed by a metallic plate (cover) which is crimped over a flanged portion of the plastic shell as shown in FIG. 1 of the '714 patent. The application of this battery for canal hearing aids is not practical for several reasons including: (1) the deformation and expansion of the shell may cause the battery to leak its harmful contents in the ear canal, particularly at the shell-cover joint; (2) the form factor of the battery assembly as described will not fit optimally in the ear canal, as the battery is button cell-like with a circular diameter and short height. Therefore, this plastic battery is more suited for non-medical applications such as industrial lighting as stated in the '714 patent (line 20, col 2).

Aceti et al., in U.S. Pat. No. 6,058,198 describes a hearing aid assembly with a battery integral therewith. According to the '198 patent, the anodic material and air-cathode assembly are contained within a unitary plastic housing along with electronic circuit and transducers (speaker and microphone). This approach eliminates the concept of a battery subassembly, thus appearing more efficient in its volumetric energy efficiency. However, combining anodic elements along with hearing aid components is not practical due to the corrosive effects of battery chemicals on circuits and transducer components within the hearing aid. Furthermore, eliminating a battery subassembly complicates the manufacturing process since the battery function cannot be independently tested or verified prior to its incorporation into the hearing device.

Leedom in U.S. Pat. No. 5,825,896 describes a hearing aid having two hinged boot portions, one of which incorporates a battery and a speaker. The '896 patent describes the shape of the boot portion as having an elliptical cross-section which is advantageous for fitting deeply and more comfortably in the ear canal. The patent does not describe the nature of the battery assembly or its casing, but presumably it is metallic since the outer surface of the battery is shown connected to a metal leaf spring (110 in FIG. 6 of the '896 patent) for providing electrical conductivity as disclosed.

In the aforementioned related '717 application, Shennib et al. describe a battery assembly having a single-walled shell with an oval cross section when combined with a section of a hearing aid connected thereto. The battery assembly in the '717 application is elongated and oval in cross section thus suited for fitting deeply and comfortably within the ear canal. Similarly, the '717 application does not describe the nature of the battery assembly or its casing, but presumably it is metallic.

A key goal of the present invention is to provide a leakage-resistance battery assembly having irregular shape with non-circular cross section thus fitting optimally into anatomical cavities, particularly an ear canal.

Another goal of the invention is to provide a battery assembly having a thin plastic shell structure suited for easy and inexpensive manufacture in a variety of complex shapes for maximizing volumetric energy efficiency when incorporated into a canal hearing device.

Another goal of the present invention is to provide a disposable hearing aid, incorporating a plastic battery assembly, and specifically suited for extended wear applications in which a hearing aid is worn continuously in the ear canal for a relatively long period of time, preferably several months.

SUMMARY OF THE INVENTION

The invention provides a battery assembly constructed of an elongated plastic shell irregularly shaped to fit optimally in anatomical cavities, particularly ear canals. The battery assembly of the invention relies structurally on a thin plastic shell which can be inexpensively formed in a variety of complex shapes, thus offering superior volumetric utilization and energy capacity when compared with conventional cells employing metal button cell designs.

In a presently preferred embodiment, the battery assembly comprises a base unit, which caps the opening of the elongated plastic shell and seals the contents of the battery assembly within. During manufacture, the elongated plastic shell and the base unit are joined together in a sealing manner by welding or other suitable bonding processes. Once the battery assembly is manufactured as a subassembly, it is then incorporated into a miniature canal hearing device for powering the electrical and transducer components within.

In the preferred embodiment, the battery assembly is configured elongated along the longitudinal axis of the ear canal when placed within, and oval (i.e. elliptical) in its cross section. The medially tapered, or domed, shell relies on its unique configuration to distribute axial stresses, and thus can be made thin with sufficient strength although made of plastic. The tapering also allows an associated hearing device to fit optimally and comfortably deep in the ear canal. The battery assembly's non-conductive biocompatible plastic structure adapted for essentially direct exposure to the environment of the ear canal, thus eliminating the need for a secondary enclosure which is required for conventional button cells. A hearing device employing the battery assembly of the invention can be made smaller and volumetrically more energy efficient, thus more suitable for extended wear applications.

In the preferred embodiment of the battery assembly, the hearing aid in which it is incorporated is disposable, intended to be discarded when the electrical energy of the battery assembly is depleted.

BRIEF DESCRIPTION OF THE DRAWINGS

The above and still further goals, objectives, features, aspects and attendant advantages of the present invention will be better understood from the following detailed description of the best mode presently contemplated for practicing the invention, with reference to certain preferred embodiments and methods, taken in conjunction with the accompanying Figures of drawing, in which.

DETAILED DESCRIPTION OF THE PREFERRED EMBODIMENTS AND METHODS

The present invention, illustrated in FIGS. 5–24, provides a plastic battery assembly having generally an elongated shell and complex non-circular cross section for fitting optimally in irregularly shaped anatomical cavities, particularly in ear canals.

Figure 1:
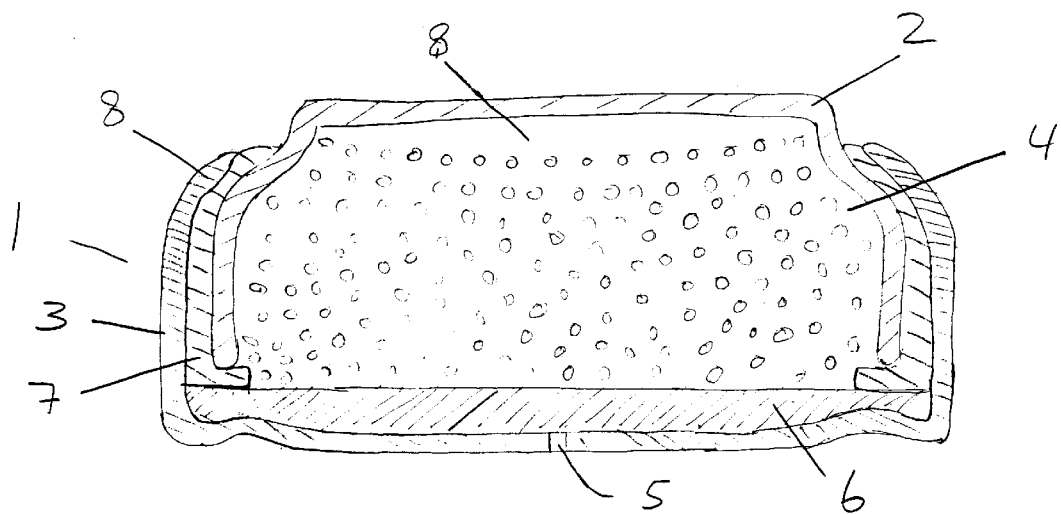
FIG. 1 is cross sectional view of a prior art button cell battery used in conventional hearing aids having metal cans for construction of anode and cathode thereof, discussed above.
Figure 2:
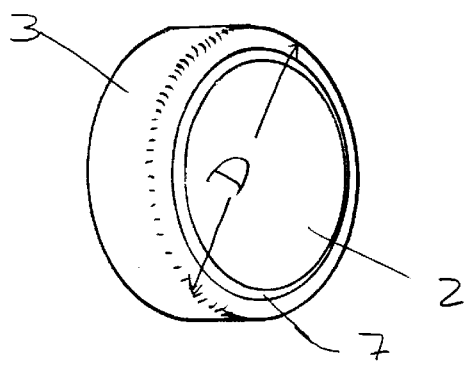
FIG. 2 is a perspective view of the prior art battery of FIG. 1 showing a circular cross section (round perimeter), discussed above.
Figure 3:
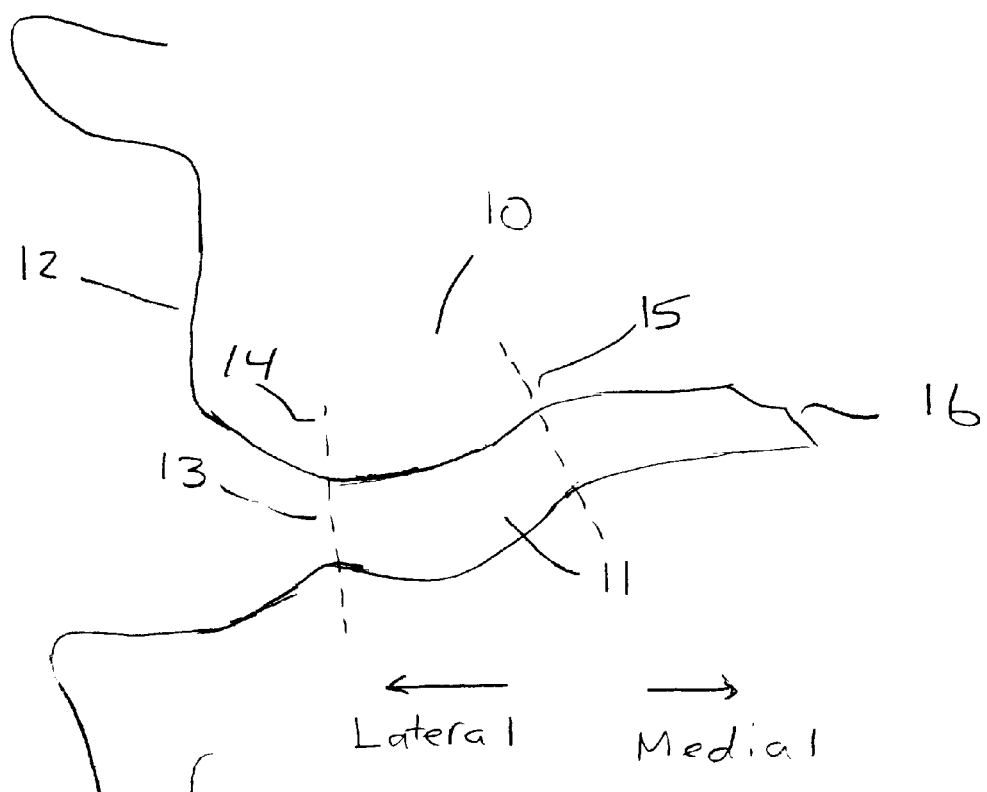
FIG. 3 is a coronal (top) view of the external ear illustrating the tortuously elongated ear canal, as described above.
Figure 4:
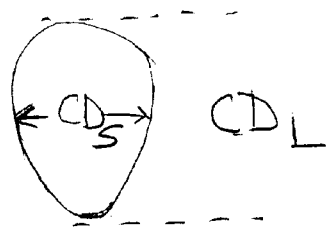
FIG. 4 is a cross sectional view of the ear canal in FIG. 3 showing its oval cross section.
Figure 5:
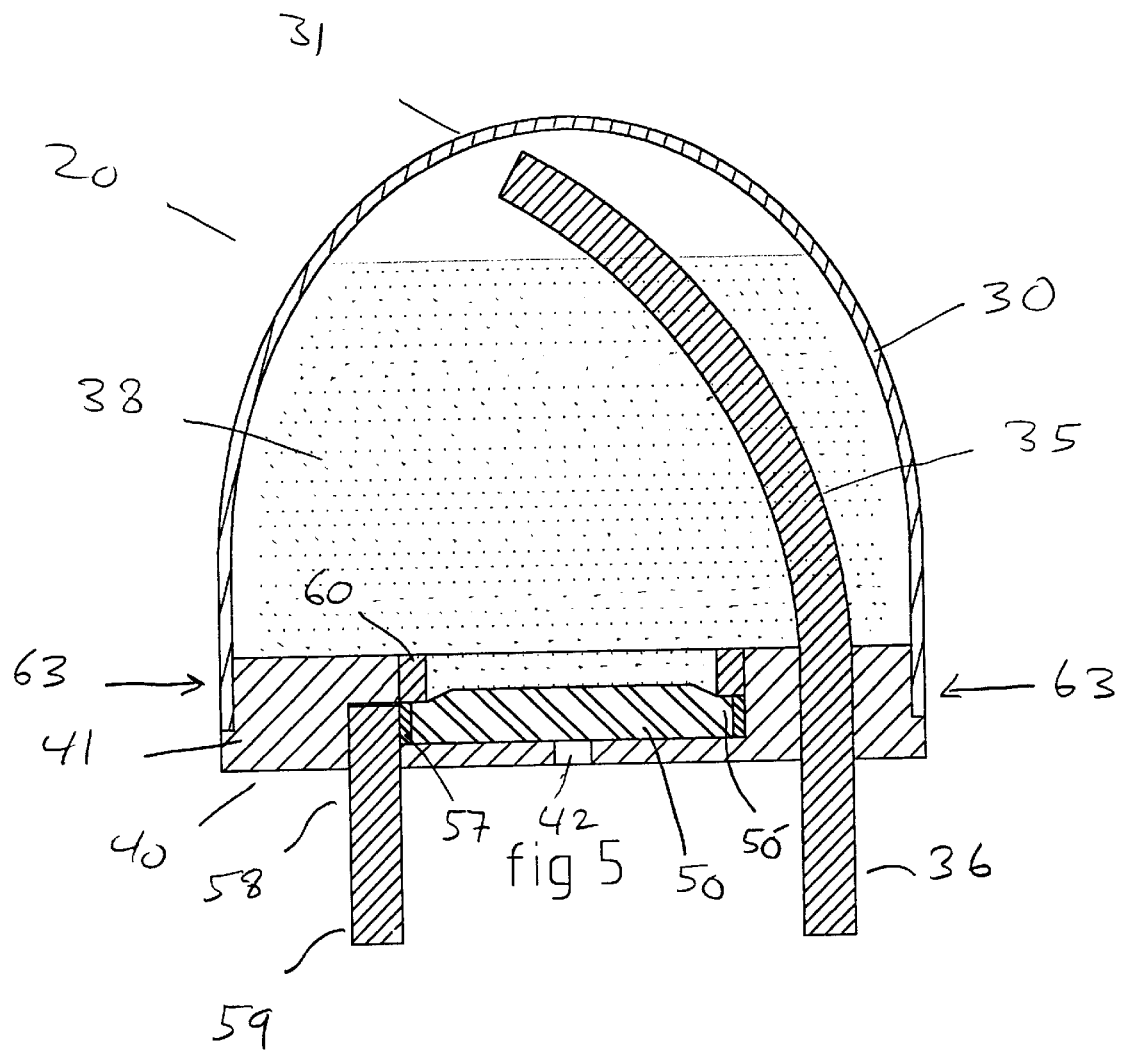
FIG. 5 is cross section of an embodiment of the plastic battery assembly of the invention, showing its thin domed shell and base unit.
Figure 6:
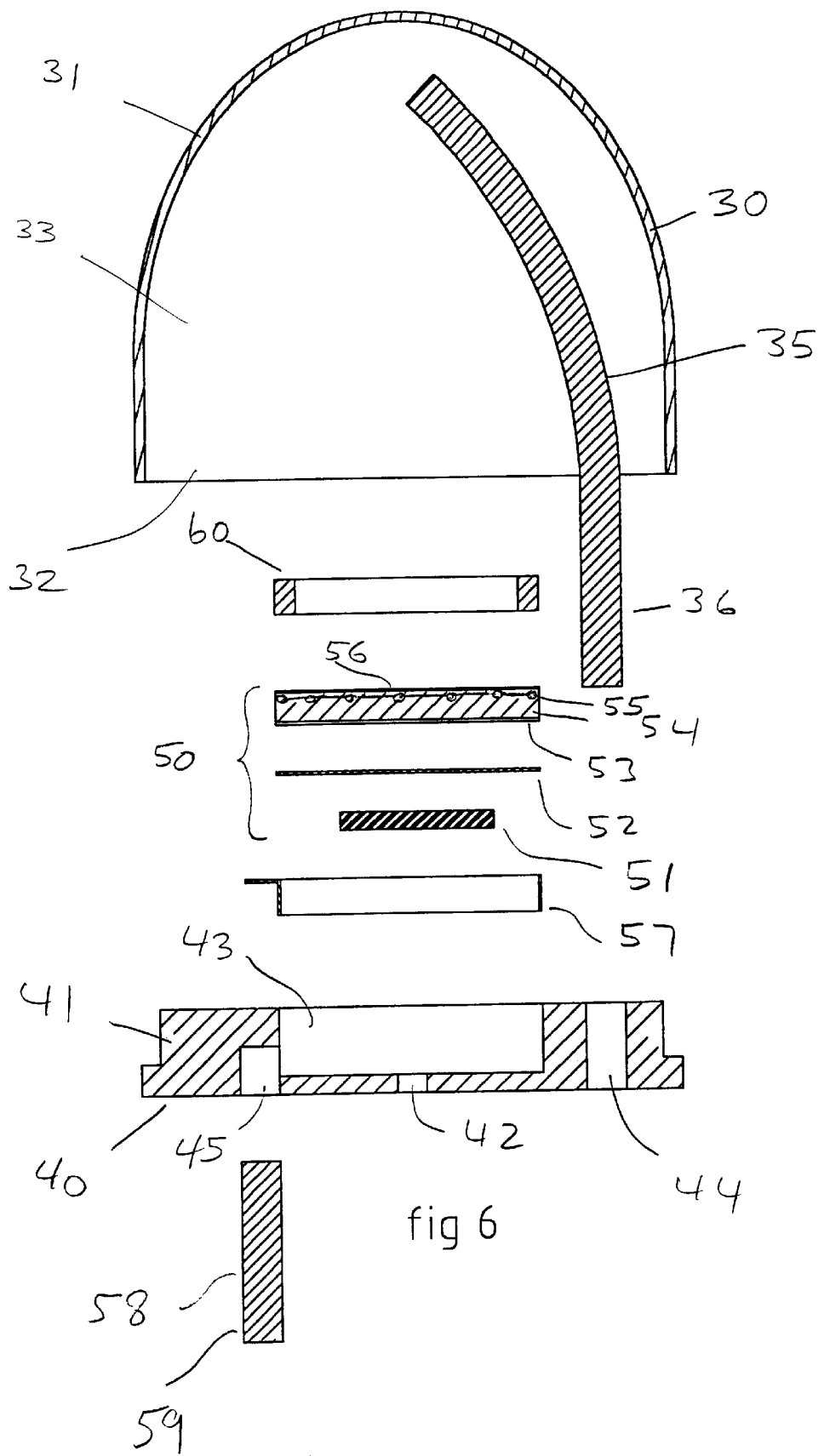
FIG. 6 is an unassembled exploded view of the battery assembly of FIG. 5.
Figure 7:
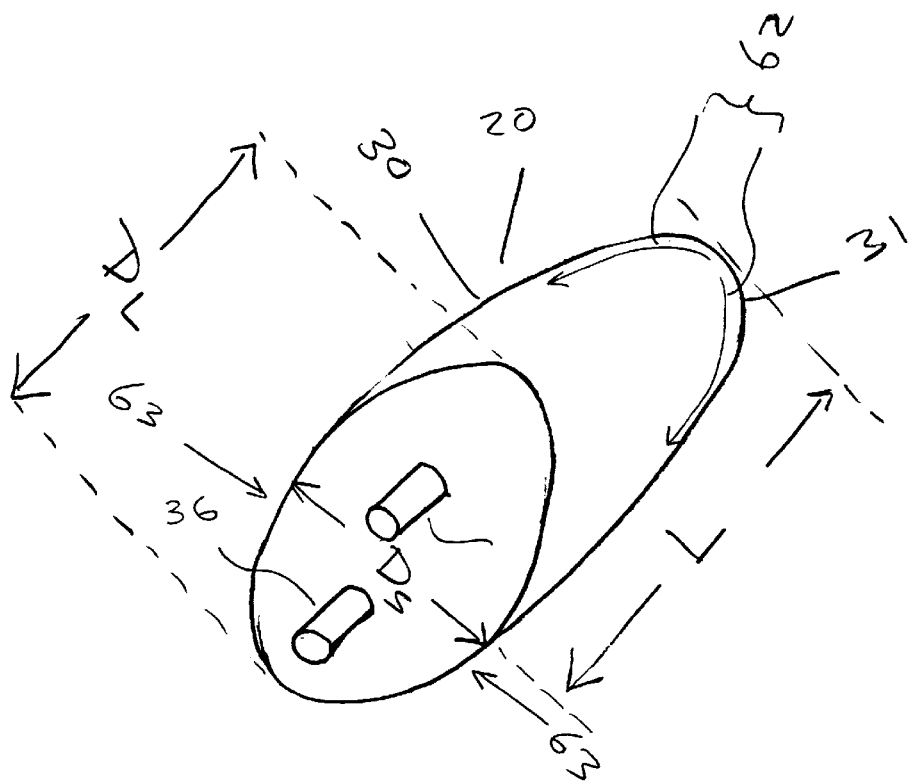
FIG. 7 is a perspective view of the plastic battery assembly of FIG. 5 showing its elongated structure and elliptical cross section with long diameter ($D_L$) and short diameter ($D_S$)
Figure 8:
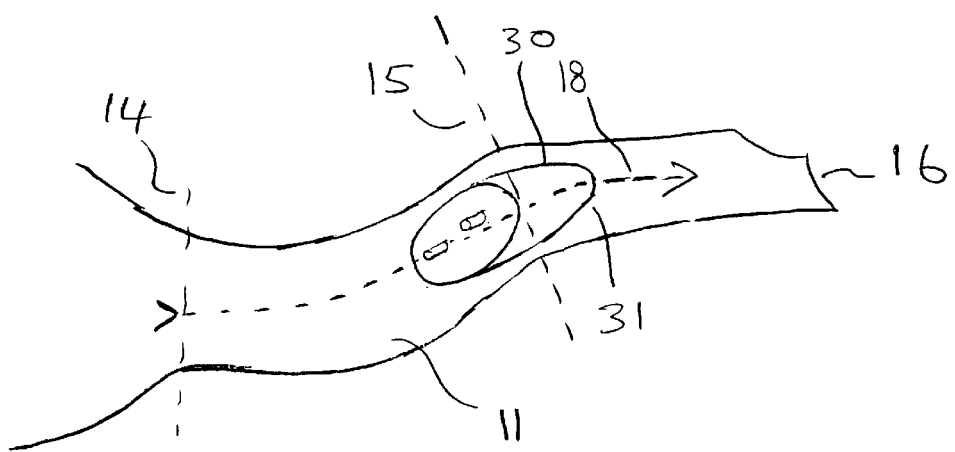
FIG. 8 is a cross sectional view of the plastic battery assembly of FIG. 7, illustrating its insertion in the ear canal.
Figure 9:
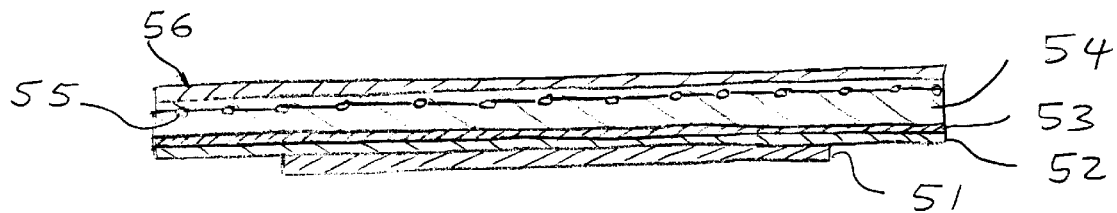
FIG. 9 is a detailed cross sectional view of the air cathode assembly.

In a preferred embodiment shown in FIGS. 5–8, the battery assembly 20 comprises an elongated thin plastic shell 30 having a shell opening 32 (FIG. 6) and a base unit 40 which covers the shell opening 32 from the bottom and seals the contents of the battery assembly within. The base unit 40 is comprised of a base substrate 41 preferably made of plastic for welding to the shell 30. The shape of the battery, shown in FIG. 7, is generally elongated with length (L) and oval cross section (i.e., egg-shaped, elliptical, rectangular with rounded corners, etc.) with long diameter ($D_L$) and short diameter ($D_S$) as shown. Long diameter ($D_L$) is preferably about 1.5 times the length of the short diameter ($D_S$), and length (L) is greater than the short diameter ($D_S$). The generally elongated and medially tapered 31 shape is optimal for insertion and positioning in the ear canal 11 along its longitudinal axis, as shown in FIG. 8.

Although plastic is structurally weaker than metals, the plastic shell 30 in the preferred embodiments is made thin with thickness comparable to metal cans used in conventional button cell batteries. This is made possible in part by the shape of the battery assembly being domed 31 (medially tapered) which tangentially distributes axial stresses 62 (FIG. 7) on the shell without bending or deforming it. This is similar in concept to an egg having exceptional structural integrity when considering its very thin shell. A plastic shell made in the shape of a conventional button cell or flat top will easily bend and break if stressed axially. In the preferred embodiments of the invention, the shell thickness is approximately 0.15 mm and can be in the range of the range of 0.1 to 0.2 mm, thus similar in thickness to metal cans used in conventional button cells. Medial tapering 31 is also particularly useful in negotiating the contours and bends of the ear canal 11 as the battery assembly, or a hearing device associated therewith, is being inserted as shown in FIG. 8 (arrow 18).

The base substrate 41 of the base unit 40 is also made of plastic. The base substrate 41 is relatively thicker and more rigid than the shell, therefore absorbent of radial stresses (63 in FIGS. 5 and 7). The combination of dome shaping and rigid base substrate endows the battery assembly with sufficient strength and break resistance in both axial and radial directions. The unique shape and material design of the battery assembly of the invention allows for improved volumetric energy efficiency by using a thin single-walled shell while maintaining sufficient structural integrity for hearing aid applications.

FIGS. 5 (assembled) and 6 (exploded view) are detailed views of the battery assembly in a preferred embodiment manufactured using zinc-air battery chemistry. The air cathode assembly 50 (shown in more details in FIGS. 6 and 9) represents several layers of active and passive materials known in the art of battery design. Air (oxygen) reaches the cathode assembly from an air hole 42 at the bottom of base unit 40. Subsequently, air is distributed underneath the cathode assembly via air distribution layer 51 made of a porous material (i.e., filter paper). Air flow is then reduced by a diffusion-limiting layer 52 which limits air diffusivity into the cathode assembly to the extent required by the current drain rate of the battery assembly. A hydrophobic membrane 53 is used to reduce moisture access into or out (i.e., reduce moisture penetration) of the battery assembly. Cathode catalyst 54 (sometimes referred to in the field, and in this specification, as the cathode assembly) facilitates oxygen reduction in the presence of electrons provided by the metallic mesh with the production of hydroxyl ions which react with the zinc anode. Cathode catalyst 54 typically contains carbon material. Embedded in the cathode catalyst is current collector 55 typically composed of a nickel mesh. The cathode current collector 55 is electrically connected to a metal collar 57 (FIGS. 5, 6, 11 and 12) which is also connected to cathode lead 58 protruding from the bottom of the base unit 40 as shown. A separator 56 (barrier layer, shown in FIGS. 6 and 9) prevents zinc particles from reaching the catalyst 54 while allowing the passage of hydroxyl ions through it. Anodic material 38 (FIG. 5) within the shell 30 is typically made of amalgamated zinc powder with organic and inorganic compounds including binders and corrosion inhibitors. The anodic material 38 also includes the electrolyte typically an aqueous solution of potassium hydroxide (KOH) or sodium hydroxide (NaOH). Current collector 55 may also be made in the form of foam, expanded metal, bonded, woven or non-woven as well known in the art of battery design. Current collector 55 is preferably made of nickel but can also be composed of an appropriate metal material including aluminum, steel and titanium.

Zinc-air chemistry is advantageous in achieving high energy capacity as well known in the field of battery technology. However, other chemistries may be employed and in certain applications are desirable. For example, by employing lithium or other non-air based reactions, the air hole and moisture gain/loss concerns can be eliminated. Other materials and arrangements may be used in the construction of the battery assembly as will become obvious to those skilled in the art of battery design.

Figure 10:
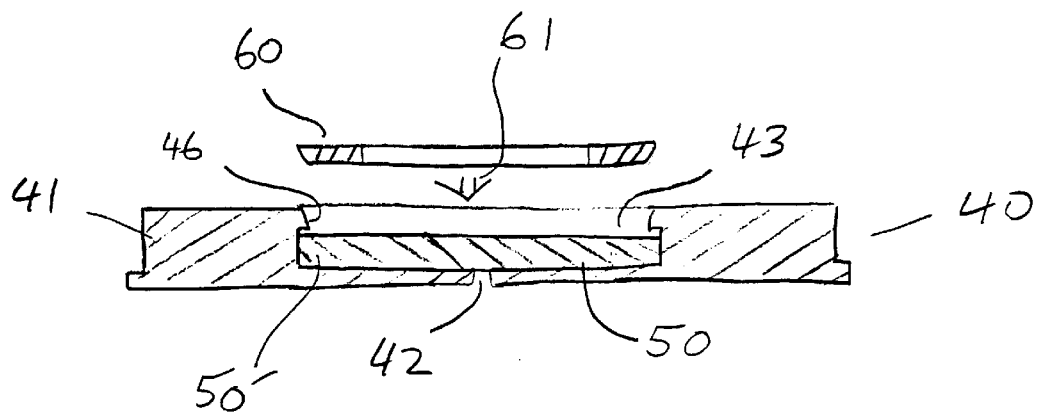
FIG. 10 is a sectional view of the base unit showing the air cathode assembly being secured to the base unit by a snap retainer collar.
Figure 11:
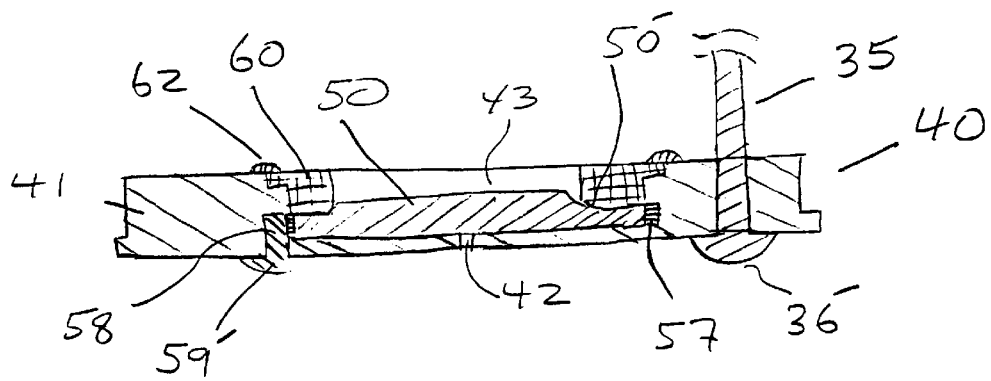
FIG. 11 is a cross sectional view of the base unit showing the air cathode assembly secured to the base unit by an adhesively bonded retainer.
Figure 12:
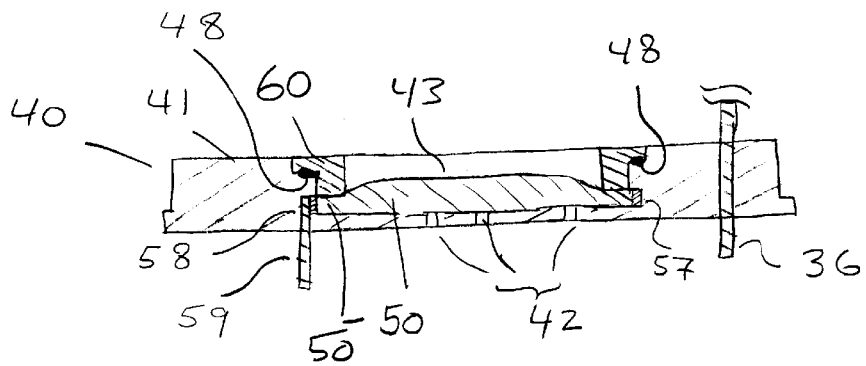
FIG. 12 is a cross sectional view of the base unit showing the air cathode assembly secured to the base unit by a welded retainer.

The cathode assembly 50 is placed onto the base unit 40 via a recess 43 within the base substrate 41 as shown FIGS. 6 and 10–12. The cathode assembly 50 is secured within recess 43 in FIG. 10 via a retention collar 60 which is pressed downward (in the direction of arrow 61) onto the cathode assembly 50 during the assembly of the base unit. The retention collar 60 is held within recess 43 via a snap ledge 46 which retains the retention collar 60 within the recess 43. The retention collar 60 in the configuration of FIG. 10 is essentially a snap ring. The retention collar 60 also applies compression on the outer edge 50' of the cathode assembly 50. The outer edge 50' is shown in a compression state in FIGS. 5, 11–12. The retention collar 60 may also be secured to the base substrate via an adhesive 62, as shown in FIG. 11, with retention ring 60 adhesively bonded to the base substrate 41. The retention ring 60 may also be welded (FIG. 12) onto the base substrate 41 at a welding area 48 using a suitable welding technique such as chemical, laser, ultrasonic or others known to those skilled in the art of material bonding and welding. FIG. 12 also shows multiple air holes 42 for a more distributed air access into the cathode assembly.

Figure 13:
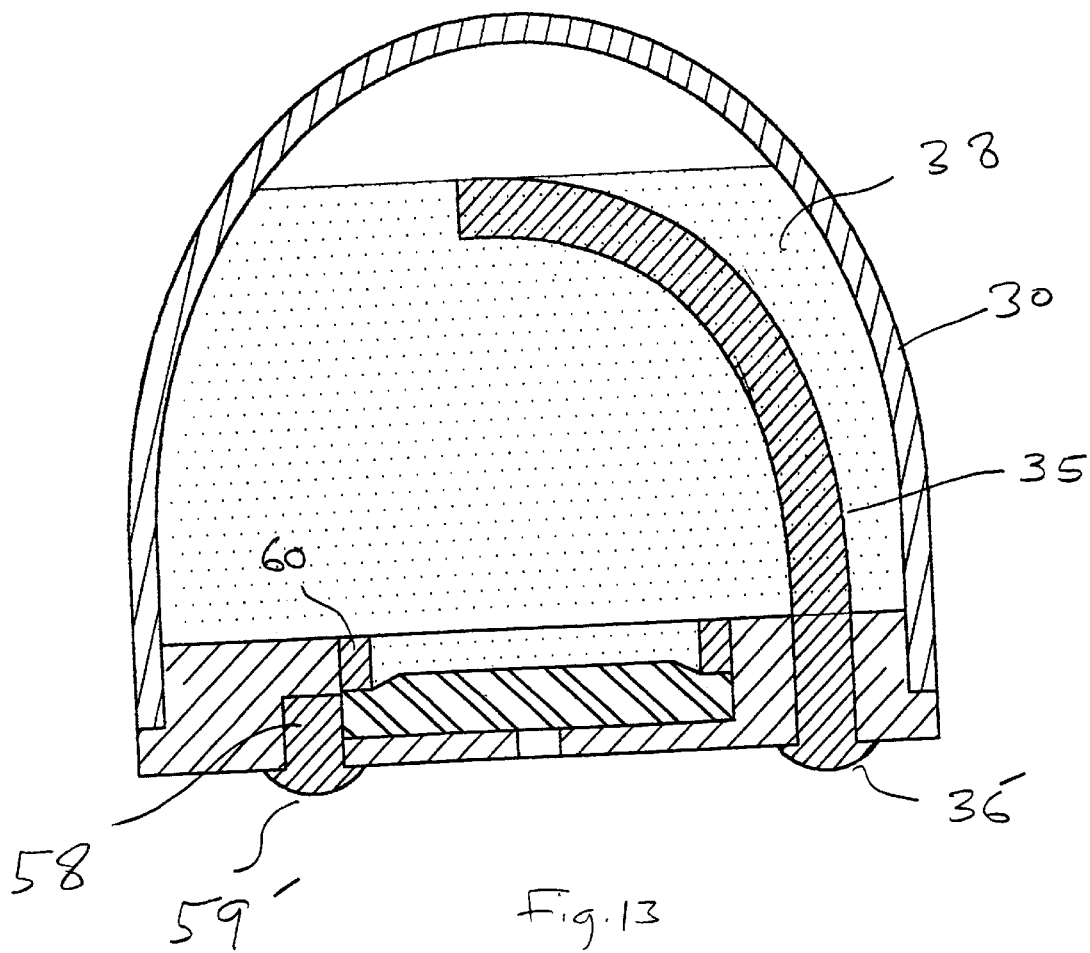
FIG. 13 is a cross sectional view of an alternate embodiment of the battery assembly having contact pad terminals.

The anode lead 35 in the preferred embodiment of FIGS. 5–6 substantially spans the length of anode cavity 33 and protrudes externally forming the negative terminal 36. The cathode lead 58 connects the cathode assembly 50 and protrudes externally forming a positive terminal 59. The terminals, 36 and 59, may be in the form of a pin terminal (FIGS. 5, 6 and 12, 14–16) or pad terminals (36' and 59') as shown in FIGS. 11 and 13. The anode and cathode leads, 35 and 58, may be press fit into the base substrate 41 in anode and cathode lead holes, 44 and 45, respectively (FIG. 6). The leads and the corresponding lead holes must be appropriately dimensioned in order to properly seal the battery assembly and prevent leakage, particularly of the electrolyte therein. The leads may be adhesively bonded into the lead holes for sealing thereof. The leads may be in the form of thin, hair-like wire if minimal current drains are expected. A lead may also be made by a conductive polymer (instead of metal). For example, lead 58' in FIG. 13 may be made by filling the cathode lead hole 45 with a conductive polymer forming a polymeric lead 58'.

Figure 14:
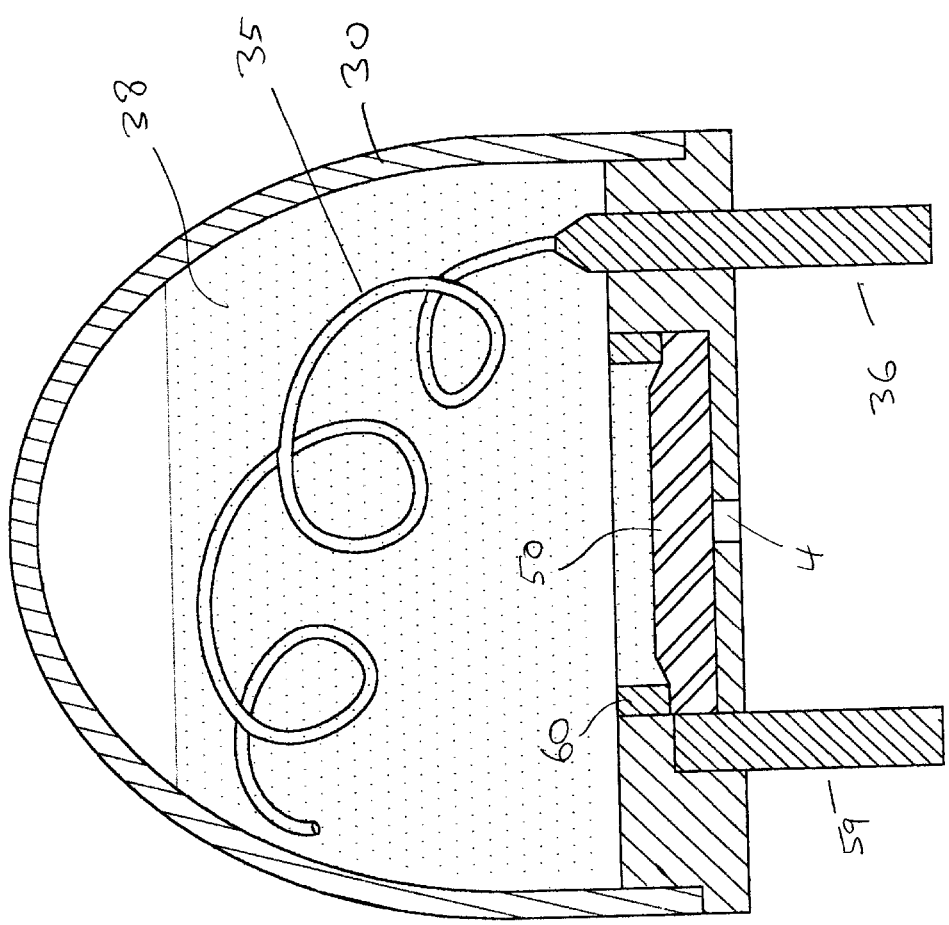
FIG. 14 is a cross sectional view of an alternate embodiment of the anode lead having a coiled section.
Figure 15:
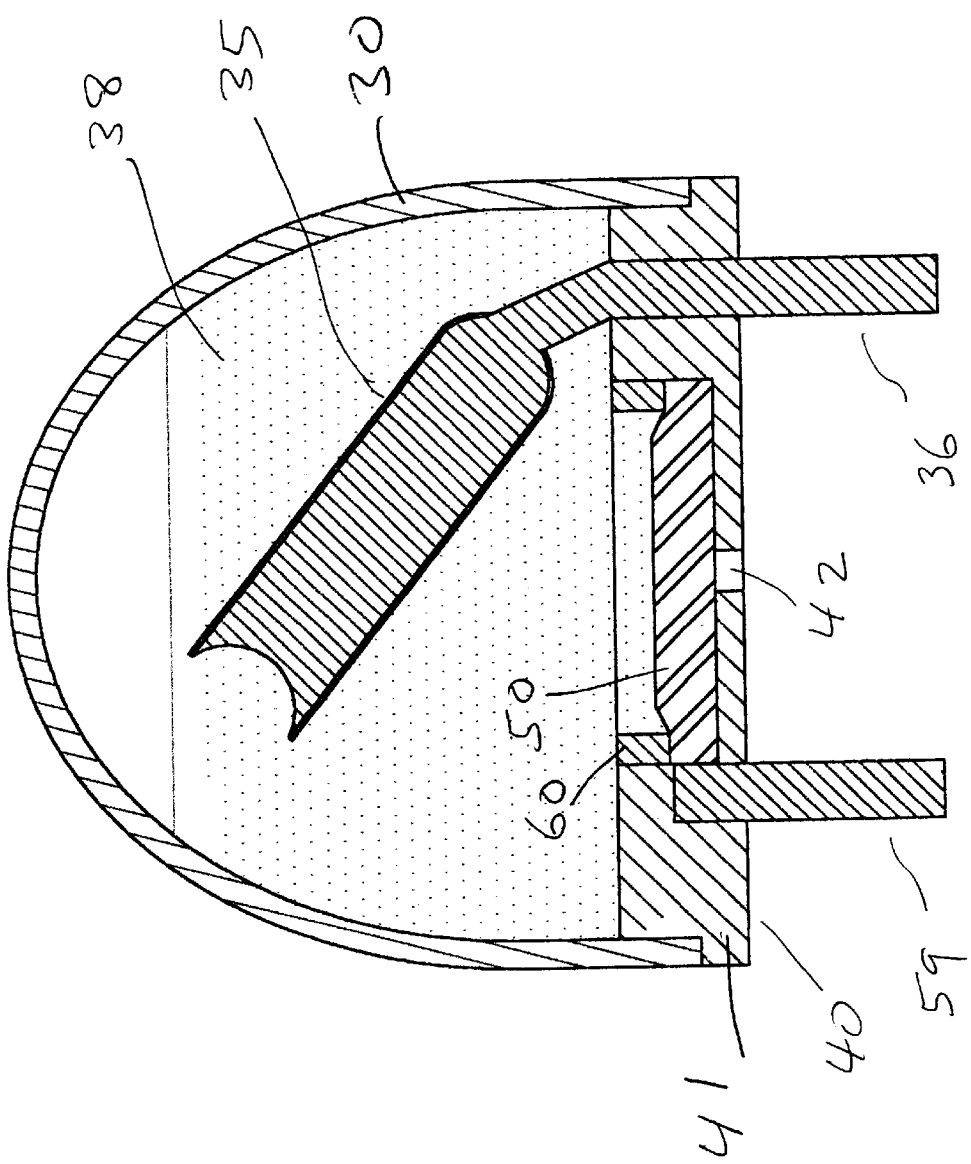
FIG. 15 is a cross sectional view of an alternate embodiment of anode lead having a strip section.

FIGS. 13–15 show alternate configurations of the anode lead 35 section in contact with the anodic material 38 within the shell. FIG. 13 shows an anode lead 35 in the form of a bent wire. FIG. 14 shows an anode lead 35 in the form of a coil. FIG. 15 shows an anode lead in the form of a cupped strip. Other shapes and configurations (not shown) for the anode lead include; mesh, metal foam and expanded metal, as known in the field of battery design.

Figure 16:
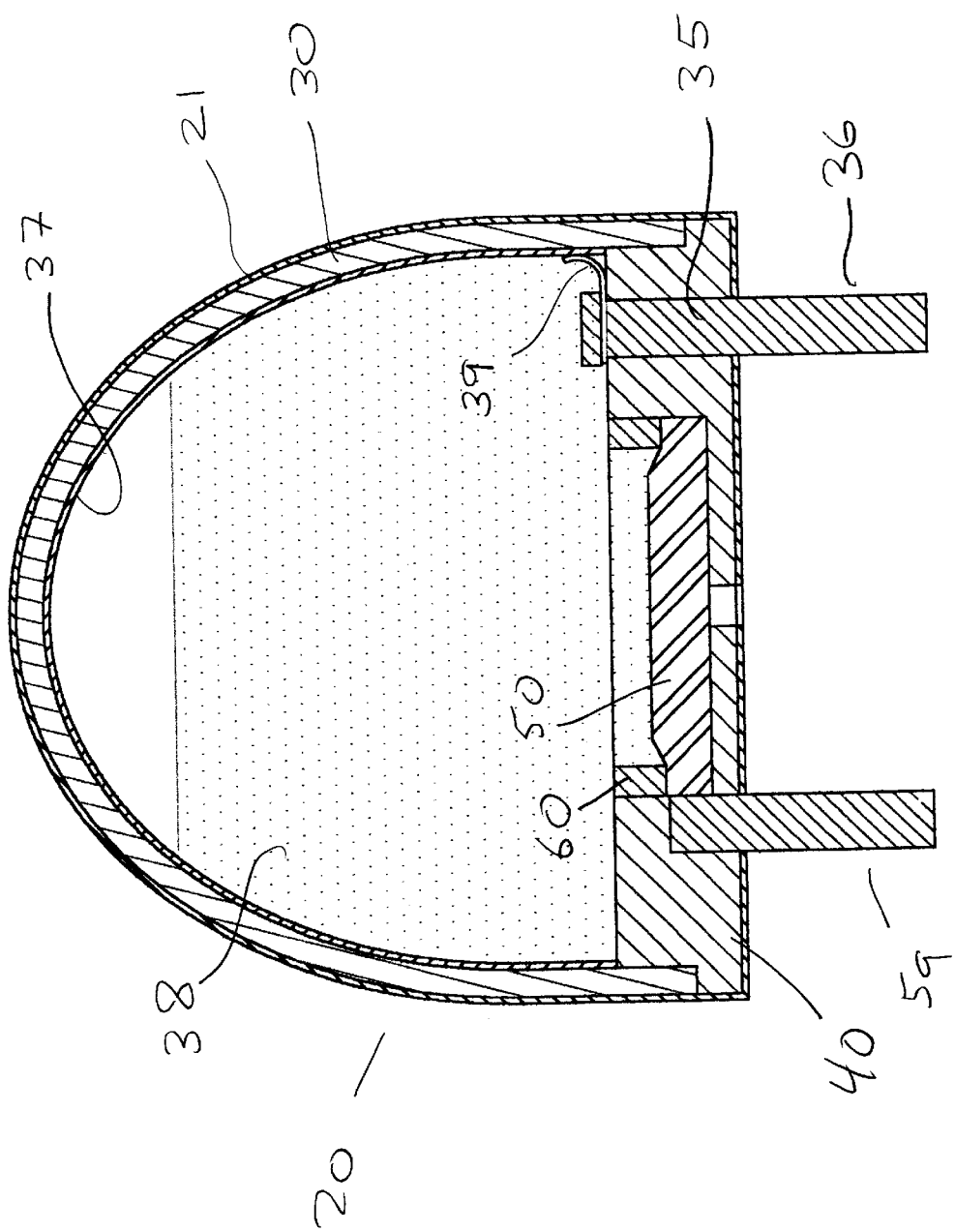
FIG. 16 is a cross sectional view of an alternate embodiment of the battery assembly with anode shell coated internally with a thin non-structural metal layer.

In another embodiment of the plastic battery assembly, shown in FIG. 16, the plastic shell is metallized on its interior surface forming a thin interior metal coating 37. Although metal, the interior coating is very thin and thus non-structural. The interior coating is preferably less than 10% of the thickness of the plastic, thus having minimal impact on the interior volume of the anode shell and the energy capacity of the battery assembly. The interior metal coating 37 provides electrical conductivity between the anodic material and the anode lead 35. A metal strip 39 electrically connects metal coating 37 to the anode lead 35 as shown in FIG. 16. Metal coating 37 may be composed of any suitable metal material including copper, brass, bronze or gold.

A major advantage of the plastic battery assembly of the invention is that it can be inexpensively and easily formed in a variety of complex shapes. Another advantage, compared with metal button cells, is the reduced weight of the battery casing since plastic has a typical density of about 1.1 mg/mm$^3$. This results in a more than 85% reduction in shell weight compared to that made of steel (density of steel is about 7.8 mg/mm$^3$). Because a battery cell represents the largest component in a canal hearing aid, weight reduction of a canal hearing device leads to improved wearing comfort, particularly in extended wear applications, in which a hearing aid is worn continuously in the ear canal for several months.

Permeability in plastic material may lead to moisture and gas ingress or egress through the plastic material, particularly in extreme humidity environments. Plastics with appropriate permeability, depending on environmental requirements, are thus preferred. This includes polypropylene and other thermoplastics, which are easily molded or formed. Environmental conditions may also require moisture/gas resistant coating. This includes ceramic coatings, polymer and metal films. These and other thin coating material can be deposited via conformal coating, vapor deposition, ion-beam deposition, or plasma enhanced chemical vapor deposition. FIG. 16 shows a thin non-structural outer coating 21 deposited on the outer surface of the shell for minimizing moisture ingress or egress as well as for general protection of the shell (e.g., earwax which may cause damage to the shell). The outer coating 21 is extremely thin and thus inconsequential in terms of dimensional effects or volumetric energy efficiency for the battery assembly. The outer coating 21 is preferably less than 10% of the thickness of the plastic shell, already considered thin.

Figure 17:
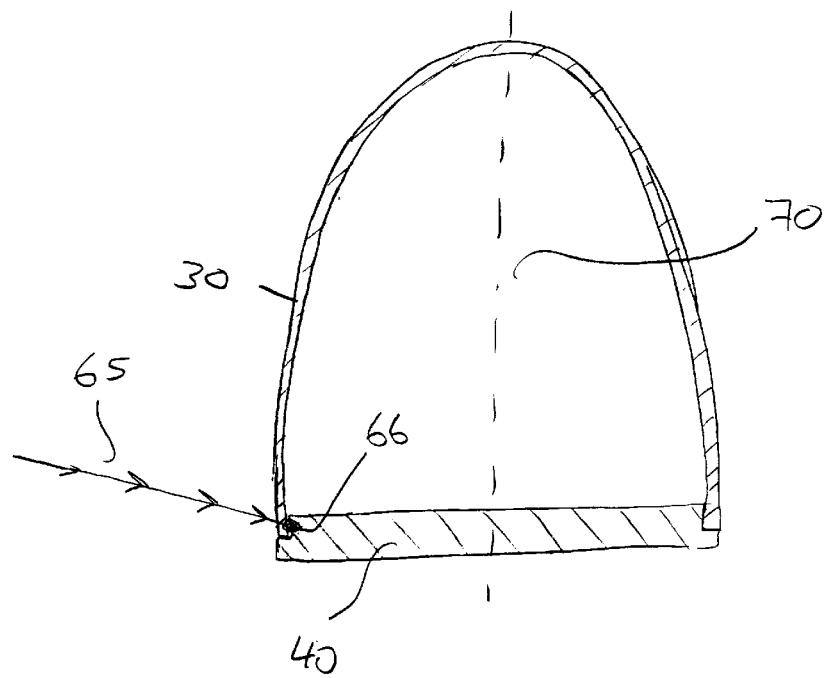
FIG. 17 shows laser transmission welding process for the shell-base joint using a translucent shell and an opaque base unit.
Figure 18:
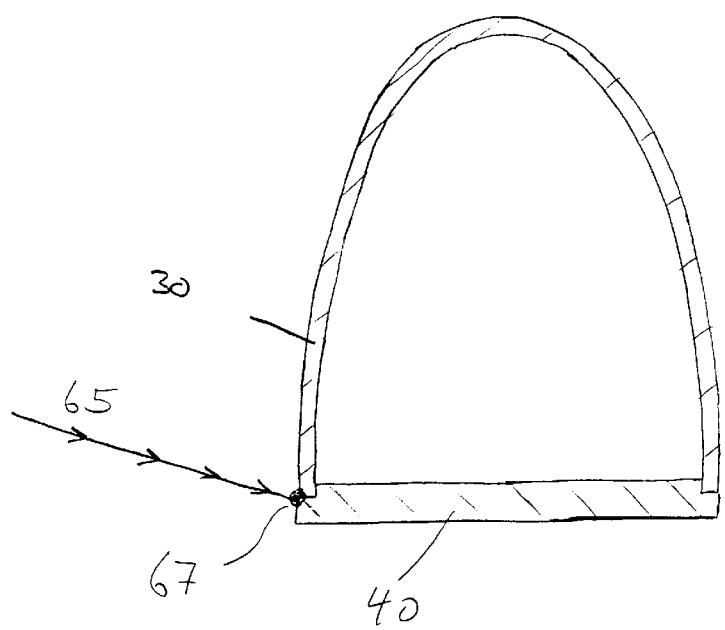
FIG. 18 illustrates a seam laser welding process for the shell-base joint.
Figure 19:
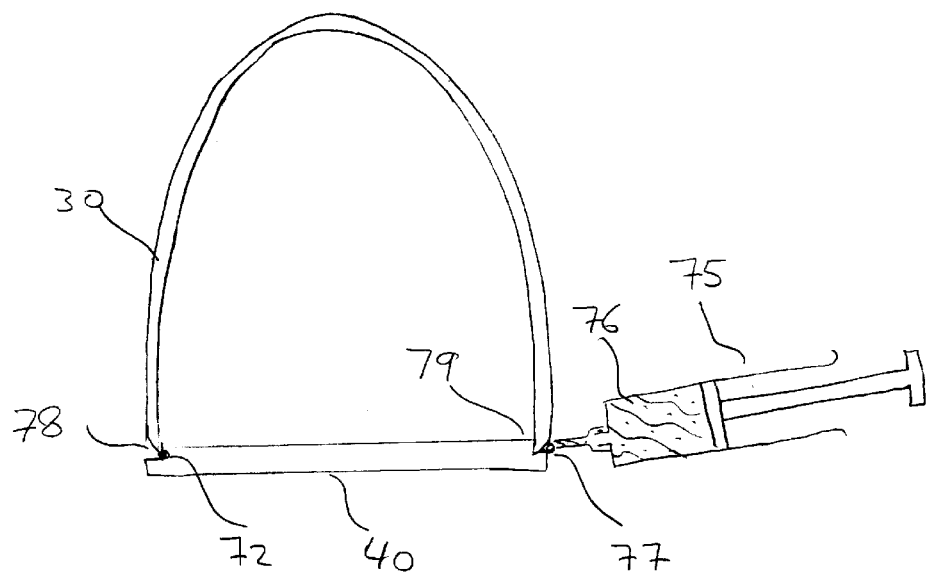
FIG. 19 illustrates a solvent bonding welding process for the shell-base joint.

During the manufacturing process of the battery assembly, the shell 30 may be bonded, in a sealing manner, to the base unit 40 using one of several bonding methods as shown in FIGS. 17–19 and described below. FIG. 17 shows laser transmission welding whereby an opaque plastic base unit 40 is capped onto the opening of a clear plastic shell 30. The translucent shell conducts a laser beam 65 to the opaque base unit which absorbs the laser energy causing it to melt for fusing the base unit and the shell at the joint area 66. The laser beam 65, or alternately the battery assembly, is rotated around axial axis 70 in order to weld the joint area circumferentially. A laser beam 65 may also be used to weld at the seam area 67 as shown in FIG. 18. FIG. 19 shows a solvent welding method for bonding the shell 30 to the base unit 40 at the joint area 79. A solvent dispenser 75 containing a solvent 76 is employed (manually or automatically). The solvent 77 is dispensed at the wicking gap area 78 forming a solvent weld 72 at the shell-base joint area 79. Ultrasonic welding (not shown) and adhesive bonding (also not shown) may be used to bond the shell to the base unit as well known in the art of welding and bonding. The above mentioned welding and bonding methods may be equally applicable for bonding the retainer collar 60 (FIGS. 5 and 6) to the plastic base unit 40.

Figure 20:
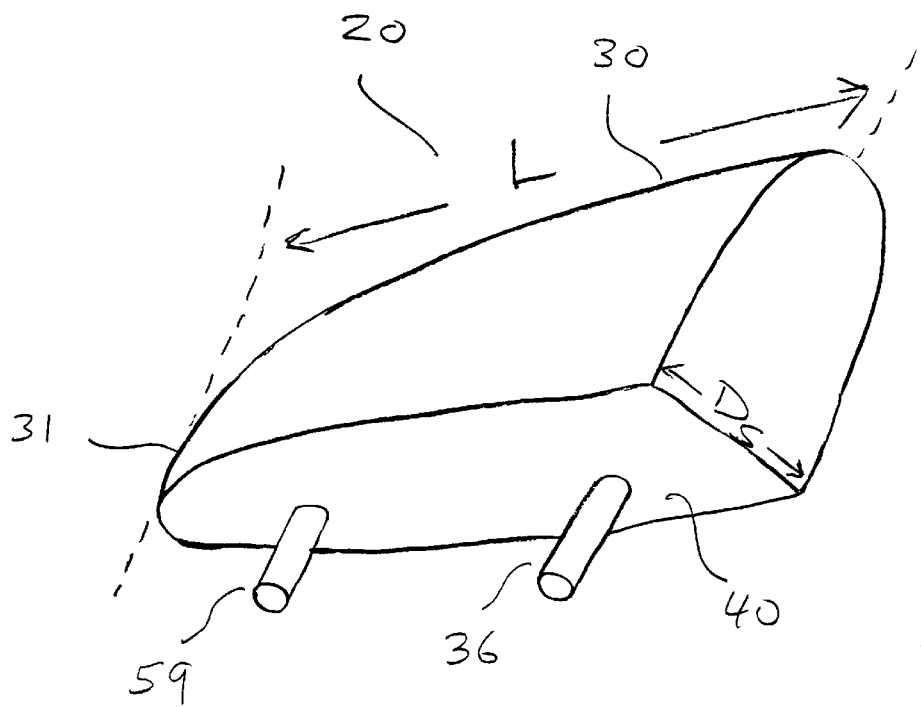
FIG. 20 is a perspective view of an alternate embodiment of the invented plastic battery assembly having elongated shell and partially oval cross section with short diameter ($D_S$)

Because the shell is made primarily of plastic, the shape of the battery assembly is not limited to the configuration shown in FIGS. 5–8. FIG. 20, for example, shows an elongated battery assembly 20 with length (L) and complex non-symmetrical cross section having a section of an oval perimeter with short diameter ($D_S$) across. Similarly, the battery assembly 20 of FIG. 20 is made with an elongated plastic shell 30 medially tapered 31 and covered at the base with a base unit 40. Battery terminals, 59 and 36, protrude through the base unit as shown.

Figure 21:
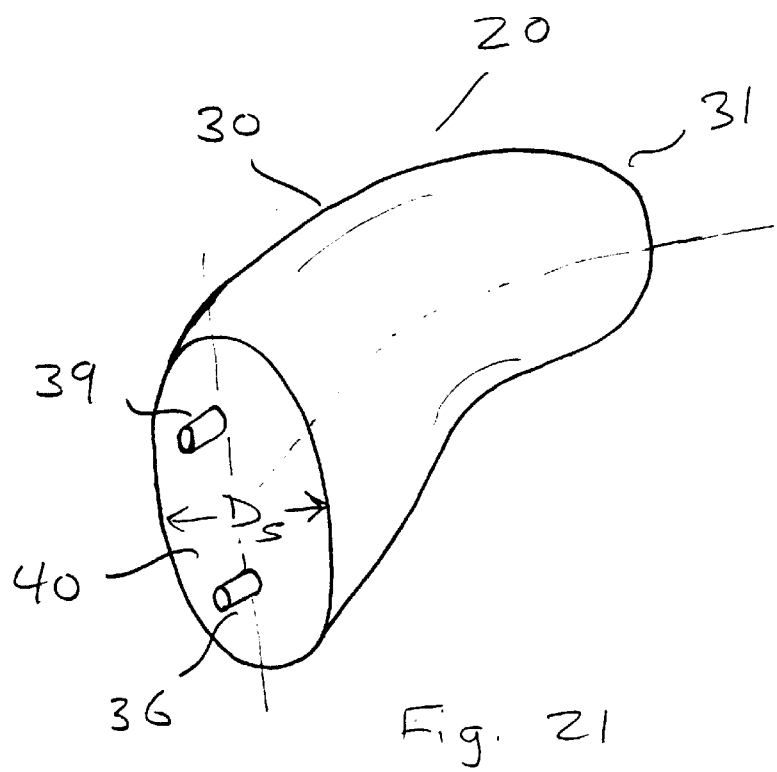
FIG. 21 is a perspective view of yet another alternate embodiment of the plastic battery assembly having complex non-symmetrical dimensions in multiple axes, with elongated shell of generally oval cross section and short diameter ($D_S$)

The plastic anode shell may also be made into other complex shapes including non-symmetrical in multiple axes as shown in FIG. 21. In this configuration, the elongated shell is contoured and medially tapered 31 and has an oval cross section with short diameter ($D_S$) across.

Figure 22:
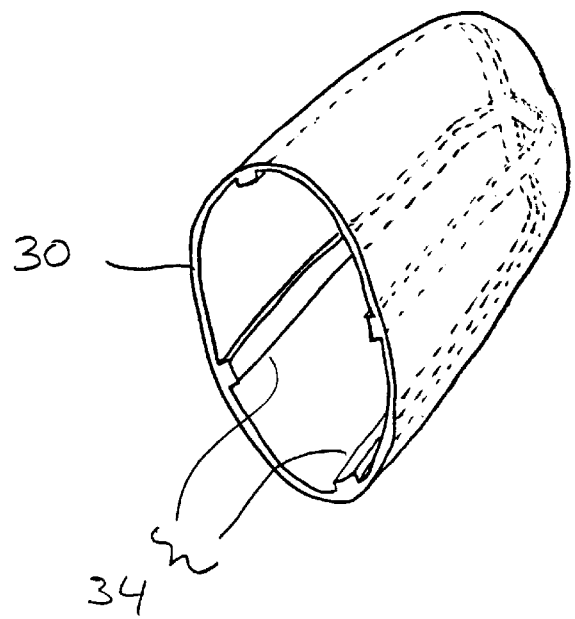
FIG. 22 is a perspective view of an anode shell having molded ribs for increased structural support.

The plastic shell used in the present invention is made thin and relies on its domed or end-tapered structure in conjunction with a relatively thicker base unit in order to distribute axial and radial stresses without causing breakage or damage to the battery assembly. The plastic shell may be made even thinner if structural ribs 34 are incorporated, preferably molded within the shell as shown in FIG. 22.

The battery assembly of the invention is particularly suited for use in canal hearing aids of the extended wear type according to the '717 application. Briefly described here, the canal hearing aid is worn deeply in the bony part of the ear canal continuously for a long period of time, preferably exceeding two months. This is in stark contrast with conventional hearing aids which are typically removed daily for sleeping or showering. The battery is typically removed within 1–2 weeks. For the extended wear application enabled by the present invention, the hearing device is preferably disposable whereby the entire device unit is disposed of once the electrical energy of the battery is depleted.

Figure 23:
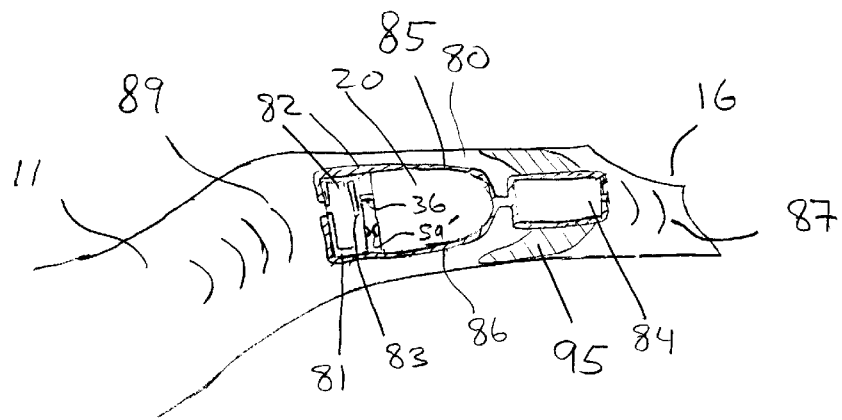
FIG. 23 is a cross sectional view of a disposable canal hearing device placed in the bony part of the ear canal for extended wear therein, and in which the incorporated battery assembly is similar in configuration to that of FIGS. 5–8.

FIG. 23 shows a disposable hearing device 80 comprised of a core assembly 85 and a sealing retainer 95. The core assembly 85 incorporates an elongated plastic battery assembly 20 with oval cross section similar to that shown in FIGS. 5–8 and 13–16. The core assembly 85 also comprises laterally a microphone section 81 and medially a speaker 84. The microphone section contains a microphone 82, for receiving incoming sounds 89 entering the ear canal 11, and amplifier circuit 83 for amplifying microphone signals representative of incoming sounds 89. The speaker 84 delivers amplified sound 87 towards the eardrum 16. A sealing retainer 95 acoustically seals the core assembly 85 in the bony part of the ear canal and also securely retains the hearing device within. The battery assembly 20 is connected to the microphone section 81 via a combination of pin terminal 36 and pad terminal 59'. A thin non-structural coating 86 encapsulates and protects the core assembly 85 including the plastic battery assembly 20 therein. The canal hearing device 80 is completely and semi-permanently positioned in the bony part of the ear canal for an extended period of time, partially due to the volumetric energy efficiency of the invented plastic battery assembly. The disposable hearing device of FIG. 23 is volumetrically efficient since the battery assembly 20 incorporated within the device 80 does not require additional enclosure typically a rigid acrylic housing in conventional hearing aid designs. The available space in the ear canal is consumed largely by the battery assembly, which is already volumetrically energy efficient by its unique design as disclosed above. In the preferred embodiment shown in FIG. 23, the core assembly is universally shaped (one-size-fits-all) to fit in a variety of ear canals, regardless of the shape and size. This is made possible by selecting an appropriately sized sealing retainer 95 for a particular ear canal. The sealing retainer 95 is made soft and compliant to conform to the ear canal in a comfortable sealing manner. In the preferred embodiment of the invention, the core assembly is essentially suspended in the ear canal with little or no contact with the walls of the ear canal as shown in FIG. 23.

Figure 24:
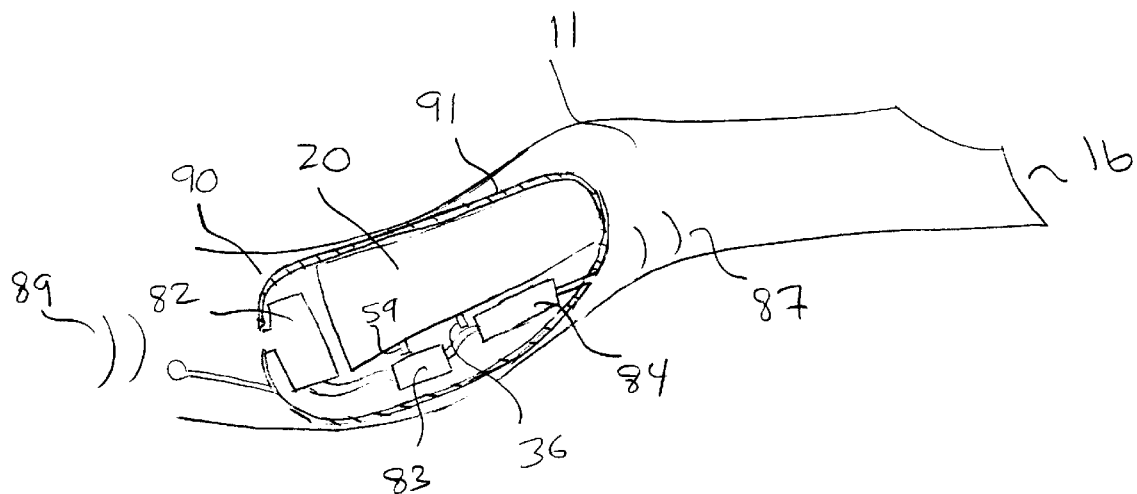
FIG. 24 is a cross sectional view of the battery assembly embodiment of FIG. 20 in a conventional canal hearing aid application.

Although particularly suited for deep canal extended-wear applications as shown in FIG. 23, the invented battery assembly may be also be used in conventional canal hearing aid designs. FIG. 24 shows a canal hearing device 90 having plastic housing 91 as typically used in the hearing aid industry. The battery assembly 20, similar to the configuration of FIG. 20, is elongated and has generally oval cross section with short diameter ($D_S$). Terminals 36 and 59 electrically connect the battery assembly 20 to other hearing aid components such as amplifier circuit, 83, microphone 82 and speaker 84.

Figure 25:
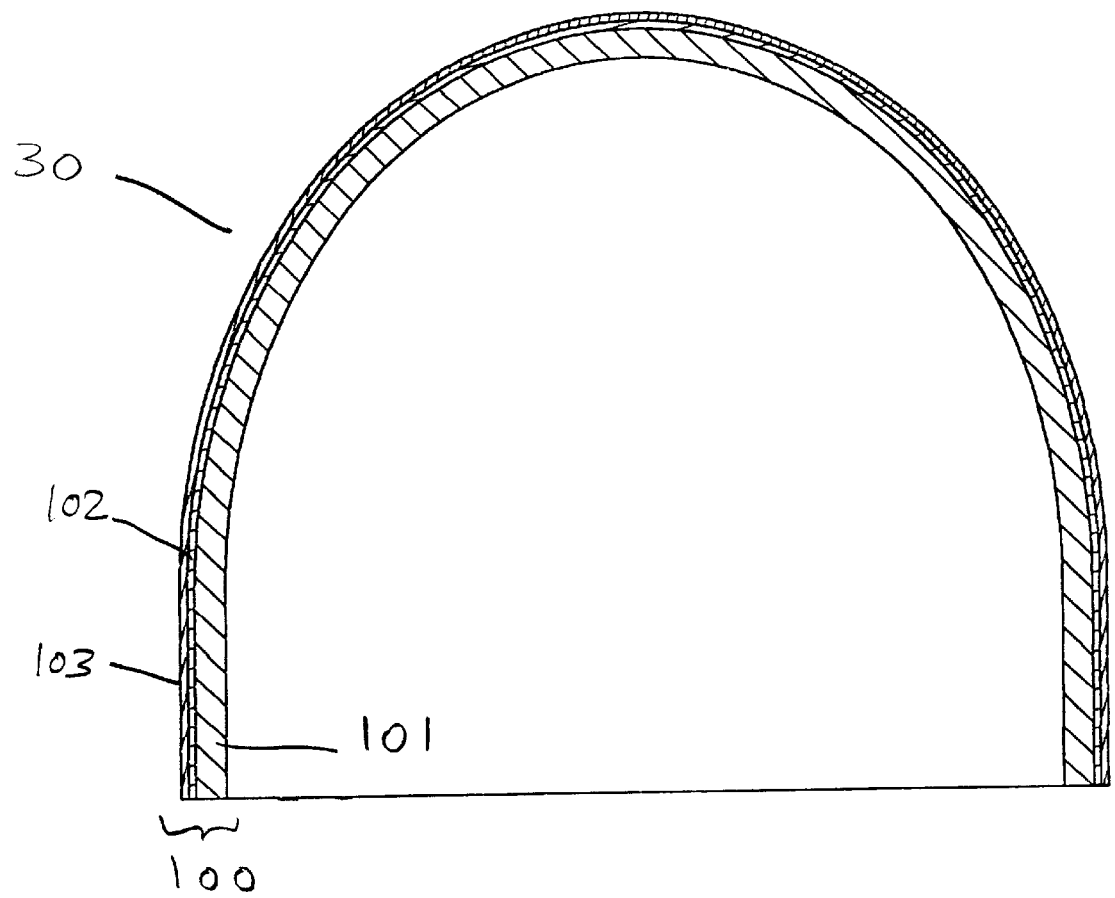
FIG. 25 illustrates an alternate embodiment of the anode shell having a multi-layered laminate structure including a metal foil.

The application of metal foil for reducing gas and moisture permeability may be used within the plastic anode shell as shown in FIG. 25. The laminate shell structure 100 comprises at least one polymer (plastic) layer in conjunction with a relatively thin non structural metal foil. FIG. 25 shows metal foil 102 (relatively thin) sandwiched between two polymer layers 101 (relatively thick) and 103 (relatively thin). The polymer layers may be from any of the following polymer/copolymer families including ABS, polyolefin, acrylic, fluoroplastic, phenolic, polyamide, polyimide, polycarbonate, polyester, polyurethane, PVC, PVDC, silicone and sulfone. One or more glue layers (not shown) may be included in the laminate structure. A glue layer may be made of synthetic adhesives, resins and the likes. The metal foil may be made from an appropriate metal or alloys including aluminum, copper, gold, nickel, silver, steel, a titanium, or zinc.

The battery assembly of the invention may be used in any communication device positioned in the ear canal including canal devices that employ direct contact with the eardrum. Therefore, the application of the plastic battery assembly for providing volumetric efficiency in ear canal applications is not limited to the above examples and should become apparent to those skilled in the art.

Although a presently contemplated best mode of practicing the invention has been disclosed herein by reference to certain preferred embodiments and methods, it will be apparent to those skilled in the art that variations and modifications of the disclosed embodiments and methods may be implemented without departing from the spirit and scope of the invention. It is therefore intended that the invention shall be limited only to the extent required by the appended claims and the rules and principles of the applicable law.

What is claimed is:

1. A battery assembly for a canal hearing device, comprising:
    an electrically non-conductive plastic shell of structural support and integrity and elongated with length (L) along the longitudinal axis of an ear canal when said hearing device is positioned within the ear canal, said plastic shell having an oval cross section to resemble the generic shape of an ear canal, with a short diameter ($D_S$) across its oval cross section, said length (L) being greater than said short diameter ($D_S$), and
    a base unit, partially composed of a base substrate, forming a cover for an opening within said plastic shell,
    said battery assembly being medially domed and having, otherwise unhoused elements that provide battery chemistry for generation of power sealed within said plastic shell and its base unit cover, and
    a conductive lead penetrating said base unit and electrically connecting interior anodic material of said battery chemistry elements to the exterior of the battery assembly for powering an associated hearing device.

2. The battery assembly of claim 1, wherein said plastic shell has thickness of less than 0.2 mm.

3. The battery assembly of claim 1, wherein said anodic material forms a negative electrode of said battery assembly.

4. The battery assembly of claim 3, wherein said anodic material is composed of zinc.

5. The battery assembly of claim 3, wherein said plastic shell comprises a thin non-supportive metallic coating along its interior surface, said metallic layer being electrically conductive and in direct contact with said anodic material.

6. The battery assembly of claim 1, wherein said conductive lead protrudes from said battery assembly forming an electrical pin terminal outside thereof.

7. The battery assembly of claim 1, wherein said conductive lead protrudes from said battery assembly forming an electrical contact pad outside thereof.

8. The battery assembly of claim 1, wherein said conductive lead comprises an internal segment substantially spanning the interior length of the shell.

9. The battery assembly of claim 8, wherein said internal segment is formed in the shape of either wire, coil, mesh, metal foam or expanded metal.

10. The battery assembly of claim 1, wherein said base substrate seals said opening of said plastic shell through bonding means.

11. The battery assembly of claim 10, wherein said bonding means comprise laser welding.

12. The battery assembly of claim 10, wherein said bonding means comprise solvent welding.

13. The battery assembly of claim 10, wherein said bonding means comprise ultrasonic welding.

14. The battery assembly of claim 10, wherein said bonding means comprise adhesive bonding.

15. The battery assembly of claim 1, wherein said battery assembly is a metal-air type with air access into the interior of said battery assembly.

16. The battery assembly of claim 1, wherein said base unit comprises a cathode assembly.

17. The battery assembly of claim 16, wherein said base substrate comprises a recess for placement of said cathode assembly therein.

18. The battery assembly of claim 16, wherein said cathode assembly is secured to said base substrate by a retainer element.

19. The battery assembly of claim 16, wherein said base substrate comprises at least one hole for air access into said cathode assembly.

20. The battery assembly of claim 16, wherein said cathode assembly comprises an air diffusion-limiting element.

21. The battery assembly of claim 16, wherein said cathode assembly comprises an air distribution element.

22. The battery assembly of claim 16, wherein said cathode assembly comprises an air-permeable hydrophobic element for allowing air access into while minimizing moisture penetration of said battery assembly.

23. The battery assembly of claim 16, wherein said cathode assembly comprises a current collector element.

24. The battery assembly of claim 1, including an electrical lead press fit through and protruding from a channel within said battery assembly.

25. The battery assembly of claim 1, including an electrical lead adhesively bonded to and protruding from a channel within said battery assembly.

26. The battery assembly of claim 1, including an electrical lead insert molded within and protruding from a channel within said battery assembly.

27. The battery assembly of claim 1, including an electrical lead protruding from a channel within said battery assembly, said electrical lead composed of a conductive polymer.

28. The battery assembly of claim 1, including an ultra thin non-structural protective coating having a thickness of less than 0.1 mm on said plastic shell.

29. The battery assembly of claim 1, wherein said plastic shell further comprises structural ribs for improving structural integrity of said plastic shell.

30. The battery assembly of claim 1, wherein said plastic shell comprises a multi-layered laminate structure including a relatively thick polymer layer and a relatively thin non-structural metal foil layer.

31. A battery assembly associated with a canal hearing device, said battery assembly comprising:
an elongated electrically non-conductive plastic shell of structural support and integrity with length (L) along the longitudinal axis of an ear canal when said hearing device is positioned within the ear canal, said plastic shell having a non-circular cross section having a short diameter ($D_S$) across its cross section, said length (L) being greater than said short diameter ($D_S$),
said plastic shell being adapted to be substantially exposed and essentially in direct contact with the environment of the ear canal when its associated hearing device is inserted therein, whereby to avoid need for a secondary structural enclosure when incorporated within said hearing device, otherwise unhoused elements sealed within said plastic shell to provide battery chemistry for generation of electrical power, and
a conductive lead protruding through said battery assembly and electrically connecting anodic material of said battery chemistry elements within said plastic shell to the exterior of said battery assembly for powering said associated hearing device.

32. The battery assembly of claim 31, wherein said plastic shell has thickness of less than 0.2 mm.

33. The battery assembly of claim 31, wherein said anodic material forms a negative electrode of said battery assembly.

34. The battery assembly of claim 33, wherein said anodic material is zinc.

35. The battery assembly of claim 33, wherein said plastic shell comprises a thin non-supportive metallic coating along its interior surface, said metallic coating being electrically conductive and in direct contact with said anodic material.

36. The battery assembly of claim 31, wherein said conductive lead protrudes from said battery assembly forming an electrical pin terminal outside thereof.

37. The battery assembly of claim 31, wherein said conductive lead protrudes from said battery assembly forming an electrical contact pad outside thereof.

38. The battery assembly of claim 31, wherein said conductive lead comprises an internal segment substantially spanning the interior length of the shell.

39. The battery assembly of claim 38, wherein said internal segment is formed in the shape of either wire, coil, mesh, metal foam or expanded metal.

40. The battery assembly of claim 31, further comprising a base unit having a base substrate for closing said plastic shell at an opening thereof.

41. The battery assembly of claim 40, wherein said base unit is bonded to said plastic shell of said battery assembly through bonding means.

42. The battery assembly of claim 41, wherein said bonding means comprise laser welding.

43. The battery assembly of claim 41, wherein said bonding means comprise solvent welding.

44. The battery assembly of claim 41, wherein said bonding means comprise ultrasonic welding.

45. The battery assembly of claim 41, wherein said bonding means comprise adhesive bonding.

46. The battery assembly of claim 31, wherein said battery assembly is a metal-air type with air access into said battery assembly.

47. The battery assembly of claim 40, wherein said base unit comprises a cathode assembly.

48. The battery assembly of claim 47, wherein said base substrate of said base unit comprises a recess for receiving said cathode assembly.

49. The battery assembly of claim 47, wherein said cathode assembly is secured to said base substrate by a retainer element.

50. The battery assembly of claim 47, wherein said base substrate comprises one or more holes for air access into said cathode assembly.

51. The battery assembly of claim 47, wherein said cathode assembly comprises an air diffusion-limiting element.

52. The battery assembly of claim 47, wherein said cathode assembly comprises an air distribution element.

53. The battery assembly of claim 47, wherein said cathode assembly comprises an air-permeable hydrophobic element for allowing air access into while minimizing moisture penetration of said battery assembly.

54. The battery assembly of claim 31, wherein said battery assembly comprises an ultra thin non-structural protective coating having a thickness of less than 0.1 mm.

55. The battery assembly of claim 31, wherein said plastic shell further comprises structural ribs for improving structural integrity of said plastic shell.

56. The battery assembly of claim 31, wherein said plastic shell comprises a multi-layered laminate structure including a relatively thick polymer layer and a relatively thin non-structural metal foil layer.

57. A hearing device incorporating a battery assembly, said battery assembly comprising:

- a support structural electrically non-conductive plastic shell elongated with length (L) along the longitudinal axis of an ear canal when said hearing device is positioned within said ear canal, said plastic shell being medially domed and having an oval cross section with a short diameter ($D_S$) across its cross section to resemble the shape of said ear canal and provide structural integrity to said plastic shell, said length (L) being greater than said short diameter ($D_S$),
- said plastic shell having sealed therein a plurality of otherwise unhoused elements that provide battery chemistry for generating electrical power,
- whereby said plastic shell gives said battery assembly a configuration to maximize its energy capacity and to fit optimally and comfortably within said ear canal, and
- an electrically conductive lead protruding into said plastic shell to electrically connect anodic material of said battery chemistry elements to the exterior of the battery assembly for powering said hearing device.

58. The hearing device of claim 57, wherein said battery assembly is zinc-air type.

59. The hearing device of claim 57, adapted for single-use disposability upon depletion of the electrical energy of said battery assembly.

60. The hearing device of claim 57, adapted for extended wear within the ear canal.

61. The hearing device of claim 57, wherein said plastic shell comprises a multi-layered laminate structure including a relatively thick polymer layer and a relatively thin non-structural metal foil layer.

62. A miniature battery assembly for hearing devices comprising;

- a structural non-conductive plastic shell having base opening,
- a non-conductive base unit forming a cover over said base opening of said plastic shell, said base unit being relatively thicker than said shell,
- a plurality of battery chemistry elements housed directly within said plastic shell and sealed therein by said base unit cover, to generate electrical power from said battery assembly,
- said plastic shell being structurally configured together with said base unit cover to provide said battery assembly with rigidity and durability sufficient for resisting breakage in use in hearing devices, and
- an electrically conductive lead protruding through said base unit and electrically connecting anodic material of said battery chemistry elements within said plastic shell to the exterior of the battery assembly for powering an associated hearing device.

* * * * *